US012767087B2

(12) United States Patent
Yamaguchi et al.

(10) Patent No.: US 12,767,087 B2
(45) Date of Patent: Oct. 20, 2026

(54) WEBBING WINDING DEVICE

(71) Applicant: KABUSHIKI KAISHA TOKAI-RIKA-DENKI-SEISAKUSHO, Aichi-ken (JP)

(72) Inventors: Ryuji Yamaguchi, Aichi (JP); Takashi Sakano, Aichi (JP)

(73) Assignee: KABUSHIKI KAISHA TOKAI-RIKA-DENKI-SEISAKUSHO, Aichi-ken (JP)

( * ) Notice: Subject to any disclaimer, the term of this patent is extended or adjusted under 35 U.S.C. 154(b) by 79 days.

(21) Appl. No.: 18/912,548

(22) Filed: Oct. 10, 2024

(65) Prior Publication Data

US 2025/0136041 A1 May 1, 2025

(30) Foreign Application Priority Data

Oct. 26, 2023 (JP) ................................ 2023-183968

(51) Int. Cl.
*B60R 22/38* (2006.01)

(52) U.S. Cl.
CPC .................................. *B60R 22/38* (2013.01)

(58) Field of Classification Search
CPC .......................... B60R 22/38; B60R 2022/287
See application file for complete search history.

(56) References Cited

U.S. PATENT DOCUMENTS

| | | | | |
|---|---|---|---|---|
| 8,534,589 | B2 * | 9/2013 | Yanagawa | B60R 22/341 242/382 |
| 8,955,785 | B2 * | 2/2015 | Yanagawa | B60R 22/28 280/805 |
| 9,027,866 | B2 * | 5/2015 | Yanagawa | B60R 22/38 242/383.5 |
| 9,150,192 | B2 * | 10/2015 | Yanagawa | B60R 22/3413 |
| 9,688,238 | B2 * | 6/2017 | Yanagawa | B60R 22/3413 |
| 9,914,430 | B2 * | 3/2018 | Nakamura | B60R 22/3413 |
| 10,507,789 | B2 * | 12/2019 | Yanagawa | B60R 22/36 |
| 2012/0318903 | A1 | 12/2012 | Yanagawa et al. | |

FOREIGN PATENT DOCUMENTS

JP 2013-001315 A 1/2013

* cited by examiner

*Primary Examiner* — Sang K Kim
(74) *Attorney, Agent, or Firm* — Studebaker Brackett PLLC

(57) ABSTRACT

A webbing winding device includes: a spool around which webbing to be worn by an occupant is wound and which is rotated in a pull-out direction by the webbing being pulled out; a trigger member provided at the spool; a torsion shaft engaged with the spool and twisted to allow rotation of the spool in the pull-out direction; and a clutch with which the torsion shaft is engaged and the trigger member is engaged, and in which part of a member engaged with the torsion shaft so as to be relatively non-rotatable is locked to the trigger member to restrict rotation of the torsion shaft with respect to the spool, the clutch being operated by being released by actuation of the trigger member and engaged with a lock member to restrict rotation with respect to the lock member.

7 Claims, 14 Drawing Sheets

WEBBING WINDING DEVICE

CROSS-REFERENCE TO RELATED APPLICATION

This application is based on and claims priority under 35 USC 119 from Japanese Patent Application No. 2023-183968 filed on Oct. 26, 2023, the disclosure of which is incorporated by reference herein.

BACKGROUND

Technical Field

The present disclosure relates to a webbing winding device.

Related Art

Japanese Patent Application Laid-Open (JP-A) No. 2013-1315 discloses a webbing winding device including a stopper member for restricting rotation of a torsion shaft with respect to a spool in a state where the torsion shaft is engaged with the spool.

By the way, from the viewpoint of reducing the number of components of the webbing winding device, it is desirable to eliminate the stopper member for restricting the rotation of the torsion shaft with respect to the spool.

SUMMARY

The disclosure provides a webbing winding device capable of eliminating a stopper member for restricting rotation of a torsion shaft with respect to a spool.

A webbing winding device according to a first aspect includes: a spool around which webbing to be worn by an occupant is wound, and which is rotated in a pull-out direction by the webbing being pulled out; a trigger member provided at the spool; a torsion shaft engaged with the spool and twisted to allow rotation of the spool in the pull-out direction; and a clutch with which the torsion shaft is engaged and the trigger member is engaged, and in which part of a member engaged with the torsion shaft so as to be relatively non-rotatable is locked to the trigger member to restrict rotation of the torsion shaft with respect to the spool, the clutch being operated by being released by actuation of the trigger member and engaged with a lock member to restrict rotation with respect to the lock member.

A webbing winding device according to a second aspect is the webbing winding device according to the first aspect, in which the clutch includes a clutch guide which is supported in a state of being relatively rotatable with respect to the torsion shaft and with which the trigger member is engaged to restrict rotation, a sleeve that is integrally rotatably engaged with the torsion shaft and that supports the clutch guide in a relatively rotatable manner, a clutch cover fixed to the torsion shaft in a state of being relatively non-rotatable with respect to the torsion shaft, and a clutch plate that is provided between the clutch guide and the clutch cover and that is displaced by relative rotation of the clutch guide with respect to the sleeve, thereby being engaged with the lock member, and part of the clutch cover is engaged with the trigger member to restrict rotation of the torsion shaft with respect to the spool.

A webbing winding device according to a third aspect is the webbing winding device according to the second aspect, in which part of the clutch cover is a locking piece portion that extends toward the trigger member and is locked to the trigger member.

A webbing winding device according to a fourth aspect is the webbing winding device according to the third aspect, in which a first recess and a second recess which open outward in a rotational radial direction are formed on both sides in a rotational circumferential direction of the locking piece portion in the clutch cover, the locking piece portion is locked to the trigger member in a state in which the trigger member can be disposed in the first recess, and the trigger member cannot be disposed in the second recess.

A webbing winding device according to a fifth aspect is the webbing winding device according to the fourth aspect, in which an interval in the rotational circumferential direction between both edges in the circumferential direction of the first recess is larger than an outer diameter of a distal end portion of the trigger member, and an interval in the circumferential direction between both edges in the rotational circumferential direction of the second recess is smaller than the outer diameter of the distal end portion of the trigger member.

A webbing winding device according to a sixth aspect is the webbing winding device according to the third aspect, in which the clutch cover includes a substrate portion formed in an annular shape having a through hole penetrating in an axial direction, and the locking piece portion includes a proximal end portion extending radially outward from an outer peripheral portion of the substrate portion, and an inclined portion extending obliquely radially outward from a radially outer end portion of the proximal end portion toward one side in the axial direction.

A webbing winding device according to a seventh aspect is the webbing winding device according to the sixth aspect, in which a width dimension of the proximal end portion in a rotational circumferential direction gradually increases from a boundary portion between the inclined portion and the proximal end portion toward a side opposite to the inclined portion, and a width dimension of the inclined portion in the rotational circumferential direction gradually increases from the boundary portion toward a side opposite to the proximal end portion.

In the webbing winding device according to the first aspect, the webbing to be worn by the occupant is wound around the spool. Further, by the webbing being pulled out, the spool is rotated in the pull-out direction. Here, if the trigger member is actuated and the trigger member is released from the clutch, the clutch is actuated. If the clutch is actuated, the clutch is engaged with the lock member to restrict the rotation of the clutch with respect to the lock member. Then, as a result of the webbing being pulled by the occupant, rotational force in the pull-out direction is input to the spool, and if the rotational force exceeds a twist resistance load of the torsion shaft, the torsion shaft is twisted. As a result, the spool is allowed to rotate in the pull-out direction with respect to the lock member. In the webbing winding device according to the first aspect, part of the member engaged with the torsion shaft in the clutch in a state of being relatively non-rotatable is locked to the trigger member. This makes it possible to restrict rotation of the torsion shaft with respect to the spool. As described above, in the webbing winding device according to the first aspect, it is not necessary to provide the stopper member for restricting rotation of the torsion shaft with respect to the spool. In other words, the stopper member for restricting rotation of the torsion shaft with respect to the spool can be eliminated.

In the webbing winding device according to the second aspect, if the trigger member is actuated, the trigger member is released from the clutch guide, and the clutch guide rotates, the clutch plate is engaged with the lock member, thereby rotation of the clutch with respect to the lock member is restricted. By the way, in the webbing winding device according to the second aspect, part of the clutch cover is locked to the trigger member. This makes it possible to restrict rotation of the torsion shaft with respect to the spool. As described above, in the webbing winding device according to the second aspect, it is not necessary to provide the stopper member for restricting rotation of the torsion shaft with respect to the spool. In other words, the stopper member for restricting rotation of the torsion shaft with respect to the spool can be eliminated.

In the webbing winding device according to the third aspect, for example, when the clutch is assembled to the spool, the locking piece portion of the clutch cover can be easily locked to a trigger wire.

In the webbing winding device according to the fourth aspect, in the clutch cover, on both sides in the rotational circumferential direction of the locking piece portion, the first recess and the second recess opened outward in the rotational radial direction are formed, respectively. Then, the locking piece portion is locked to the trigger member in a state where the trigger member can be disposed in the first recess. Here, the trigger member cannot be disposed in the second recess. This makes it possible to prevent the locking piece portion from being locked to the trigger member in a state where the trigger member is disposed in the second recess. In other words, it is possible to prevent erroneous assembly at the time of manufacturing the webbing winding device.

In the webbing winding device according to the fifth aspect, it is possible to prevent the locking piece portion from being locked to the trigger member in a state where the trigger member is disposed in the second recess. In other words, it is possible to prevent erroneous assembly at the time of manufacturing the webbing winding device.

In the webbing winding device according to the sixth aspect, for example, when the clutch is assembled to the spool, the locking piece portion of the clutch cover can be easily locked to the trigger wire.

In the webbing winding device according to the seventh aspect, durability against a load in the circumferential direction of the proximal end portion can be secured, and excellent press workability at the time of punching an outer shape of the clutch cover can be achieved.

BRIEF DESCRIPTION OF THE DRAWINGS

An exemplary embodiment of the present disclosure will be described in detail based on the following figures, wherein.

DETAILED DESCRIPTION

A webbing winding device according to an embodiment of the disclosure will be described with reference to FIGS. 1 to 13.

Figure 1:
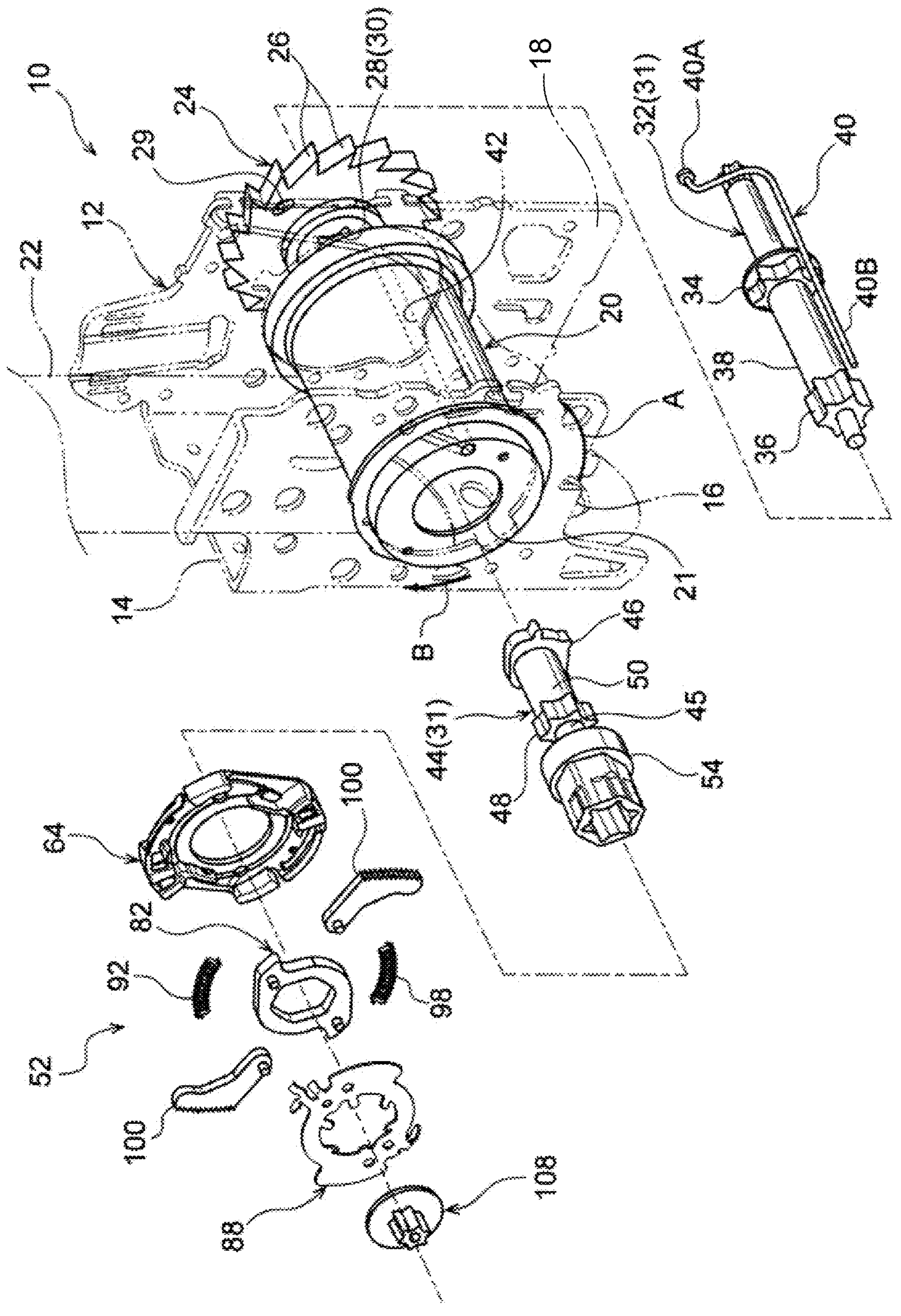
FIG. 1 is an exploded perspective view illustrating a configuration of a main part of a webbing winding device according to the present embodiment.

As illustrated in FIG. 1, a webbing winding device 10 according to the embodiment of the disclosure includes a frame 12, a spool 20, a webbing 22, a lock gear 24, a main torsion shaft 32 constituting a force limiter mechanism 31, a trigger wire 40, a sub-torsion shaft 44, and a clutch 52. The webbing winding device 10 includes a force limiter load switching mechanism (not illustrated). The frame 12 will be described first, and then the spool 20, the webbing 22, the lock gear 24, the main torsion shaft 32, the trigger wire 40, the sub-torsion shaft 44, the clutch 52, and the force limiter load switching mechanism will be described in this order.

As illustrated in FIG. 1, the frame 12 is formed in a substantially concave shape in plan view, and includes a plate-shaped back plate 14 fixed to a vehicle body. Leg pieces 16, 18 extend substantially at right angles from both end portions in a width direction of the back plate 14. A known lock mechanism (not illustrated) is attached to the outside of the leg piece 18.

The spool 20 is formed in a cylindrical shape having a through hole 21 penetrating in the axial direction and is disposed between the leg piece 16 and the leg piece 18 of the frame 12. The spool 20 is disposed in a state in which the axial direction is along a direction in which the leg piece 16 faces the leg piece 18, and is rotatably supported by the frame 12 via the main torsion shaft 32, the sub-torsion shaft 44, and the like, described later.

The webbing 22 is to be worn on the body of the occupant, and a proximal end portion which is one end portion of the webbing 22 in a longitudinal direction is locked to the spool 20. The spool 20 is configured to wind and store the webbing 22 from the proximal end side by rotating in a winding direction (a direction of an arrow A in FIG. 1, and the like) which is one rotation direction.

The lock gear 24 is disposed coaxially with the spool 20 on one side in the axial direction of the spool 20. A gear portion 26 is formed on an outer peripheral portion of the lock gear 24. A through hole 28 penetrating in the axial direction is formed in an axial center portion of the lock gear 24, and a spline-shaped engaged portion 30 is formed in an inner peripheral portion of the through hole 28.

The lock gear 24 is engaged with a lock member (not illustrated) when the vehicle suddenly decelerates and when the spool 20 rapidly rotates in the pull-out direction. This results in restricting (locking) rotation of the lock gear 24 in the pull-out direction (direction of the arrow B in FIG. 1, and the like) and restricting rotation of the spool 20 in the pull-out direction.

The main torsion shaft 32 is disposed coaxially with the spool 20 and the lock gear 24 and is inserted into the through hole 21 of the spool 20 and the through hole 28 of the lock gear 24. In the main torsion shaft 32, a spline-shaped first engagement portion 34 is formed at a central portion in the longitudinal direction, and a spline-shaped second engagement portion 36 is formed at a distal end portion of the main torsion shaft 32. The main torsion shaft 32 is integrally rotatably fixed to the lock gear 24 by the first engagement portion 34 being engaged with the engaged portion 30 of the lock gear 24. Further, the main torsion shaft 32 is integrally rotatably fixed to the spool 20 by the second engagement portion 36 being engaged with an engaged portion (not illustrated) formed at an intermediate portion in the axial direction of an inner peripheral portion of the spool 20. A portion of the main torsion shaft 32 between the first engagement portion 34 and the second engagement portion 36 is configured as a first energy absorption portion 38 for absorbing kinetic energy of the occupant to be used for pulling the webbing 22 as described later.

A proximal end portion 40A of the trigger wire 40 as a trigger member is inserted into a hole portion 29 formed at a position radially outside the through hole 28 in the lock gear 24 and locked to the lock gear 24. On the other hand, a distal end side of the trigger wire 40 from the proximal end portion 40A is inserted into a hole portion 42 formed in the spool 20 in parallel with the through hole 21, and a distal end portion 40B of the trigger wire 40 protrudes from the spool 20 to the other side in the axial direction.

The sub-torsion shaft 44 is disposed coaxially with the main torsion shaft 32, and a proximal end side from the central portion in the longitudinal direction of the sub-torsion shaft 44 is inserted into the through hole 21 of the spool 20. On the other hand, a distal end side from the central portion in the longitudinal direction of the sub-torsion shaft 44 protrudes from the spool 20 to the other side in the axial direction. In the sub-torsion shaft 44, a first engagement portion 46 having at least a partially splined shape is formed at a proximal end portion of the sub-torsion shaft 44, and a second engagement portion 48 having a splined shape in a similar manner is formed at a distal end portion of the sub-torsion shaft 44. The first engagement portion 46 is engaged with an intermediate portion in the axial direction of the inner peripheral portion of the spool 20. Thus, the sub-torsion shaft 44 is integrally rotatably fixed to the spool 20. Furthermore, a portion of the sub-torsion shaft 44 between the first engagement portion 46 and the second engagement portion 48 is configured as a second energy absorption portion 50 for absorbing kinetic energy of the occupant to be used for pulling the webbing 22 as described later.

Figure 2:
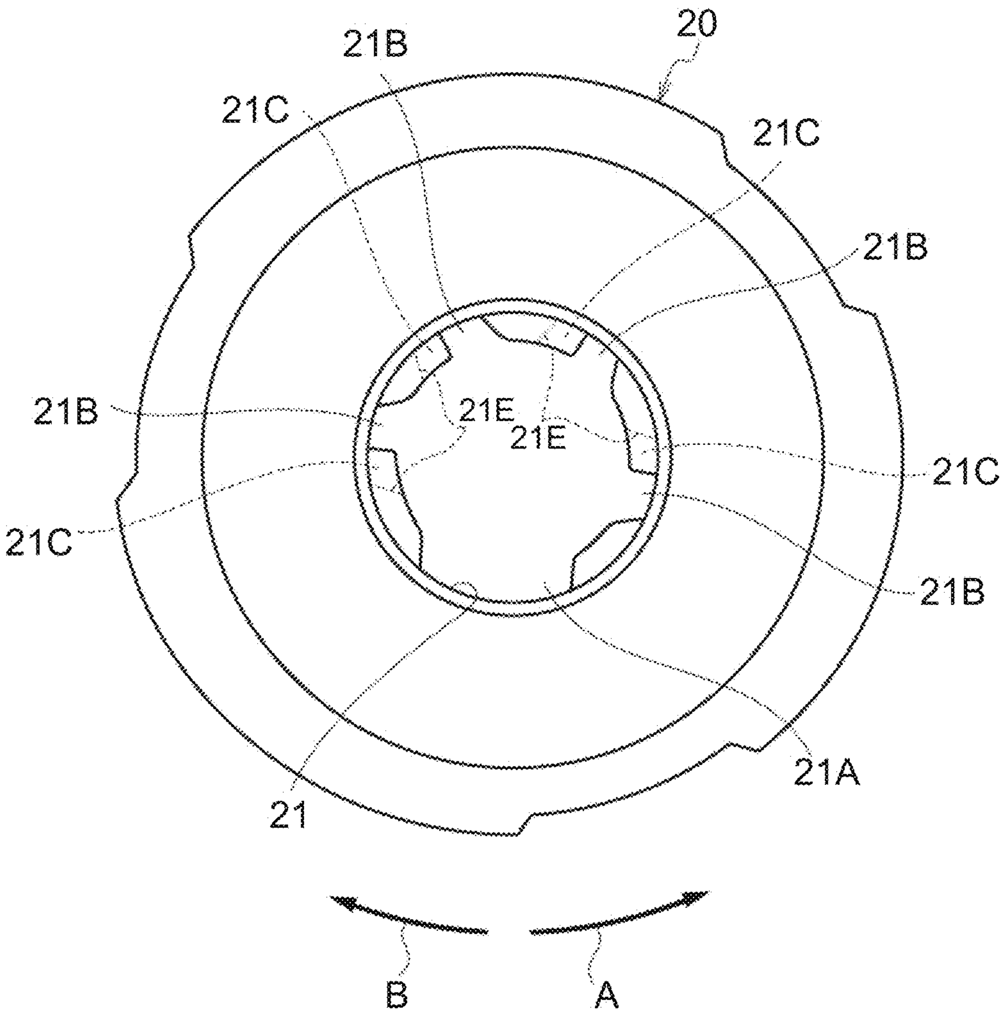
FIG. 2 is a view of a spool illustrated in FIG. 1 as viewed from the other side in an axial direction.
Figure 3:
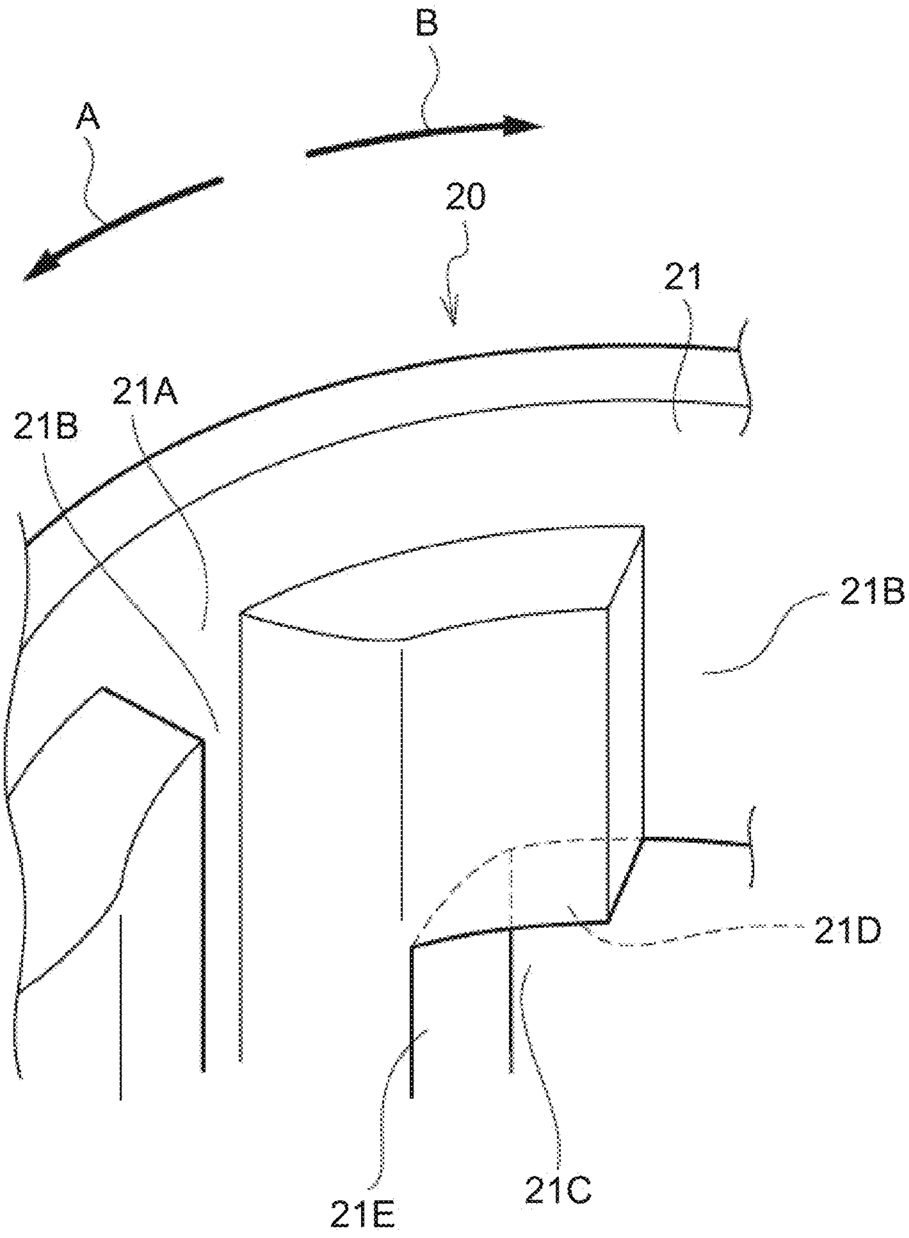
FIG. 3 is an enlarged perspective view illustrating a sub-torsion shaft accommodation portion of the spool illustrated in FIG. 1.

As illustrated in FIGS. 2 and 3, a plurality of (four in the present embodiment) insertion groove portions 21B are formed in an inner peripheral portion of a sub-torsion shaft accommodation portion 21A in which the sub-torsion shaft 44 is to be accommodated in the through hole 21 of the spool 20. The insertion groove portions 21B are each formed in a substantially trapezoidal shape when viewed from the axial direction of the spool 20 and are opened radially inward of the spool 20. Further, the insertion groove portions 21B are arranged at predetermined intervals along the circumferential direction of the spool 20 and extend along the axial direction of the spool 20.

A plurality of (four in the present embodiment) engagement groove portions 21C are formed in the sub-torsion shaft accommodation portion 21A of the spool 20. Each of the engagement groove portions 21C extends from the insertion groove portion 28 along a winding direction of the spool 20 and is opened radially inward of the spool 20. Further, the engagement groove portions 21C communicate with one side portions of the insertion groove portions 21B in the axial direction of the spool 20. Note that the engagement groove portions 21C do not extend from the communicated insertion groove portion 28 to the adjacently provided insertion groove portions 21B. As a result, surfaces on the other side in the axial direction of the spool 20 in the engagement groove portions 21C are set as axial locking surfaces 21D, and surfaces on the winding direction side of the spool 20 in the engagement groove portions 21C are set as circumferential locking surfaces 21E. The axial locking surfaces 21D and the engagement groove portions 21C are formed so as to be engageable with engaged protrusions 46A of the sub-torsion shaft 44 described later in detail.

Figure 4:
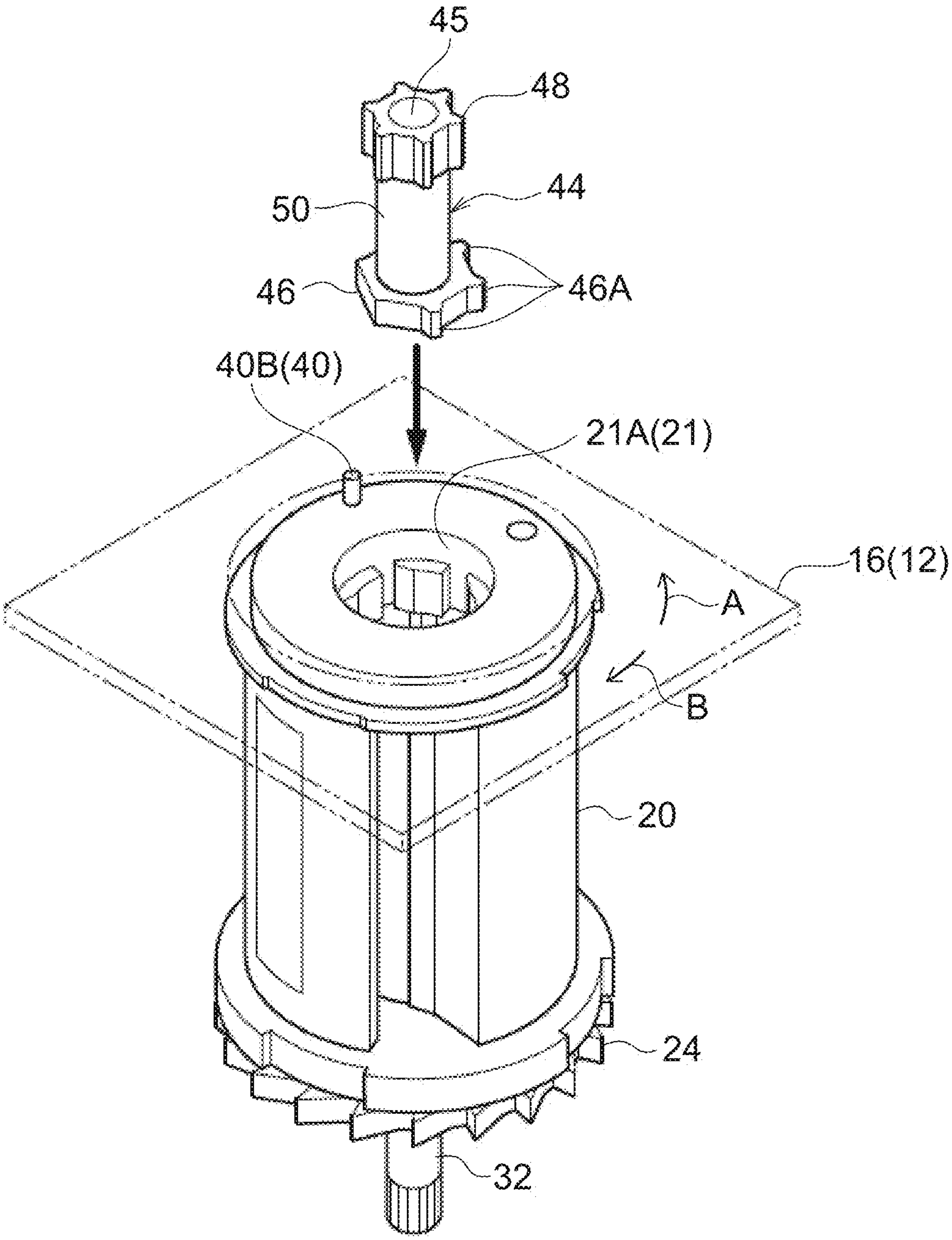
FIG. 4 is a perspective view illustrating a state before the sub-torsion shaft is inserted into the spool.

As illustrated in FIG. 4, the first engagement portion 46 of the sub-torsion shaft 44 is configured to be insertable into the sub-torsion shaft accommodation portion 21A. A plurality of (four in the present embodiment) engaged protrusions 46A each having a substantially trapezoidal cross section are provided on an outer peripheral portion of the first engagement portion 46, and the engaged protrusions 46A protrude radially outward of the first engagement portion 46 from the outer peripheral portion of the first engagement portion 46. Further, the engaged protrusions 46A are arranged at predetermined intervals in the circumferential direction of the first engagement portion 46 so as to correspond to the insertion groove portions 21B and are configured to be insertable into the insertion groove portion 28.

Figure 5:
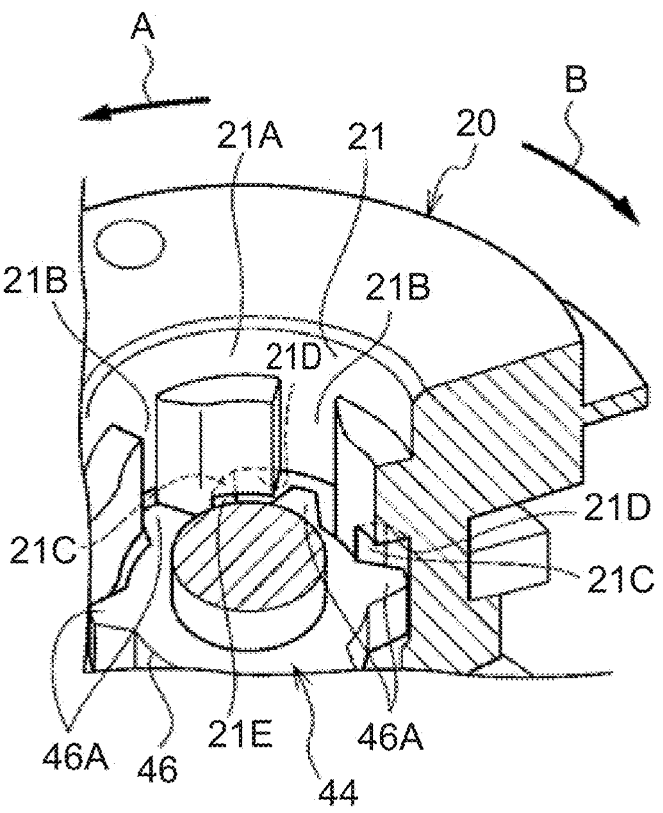
FIG. 5 is a partially broken perspective view illustrating an initial state of a step of inserting the sub-torsion shaft into the spool.
Figure 6:
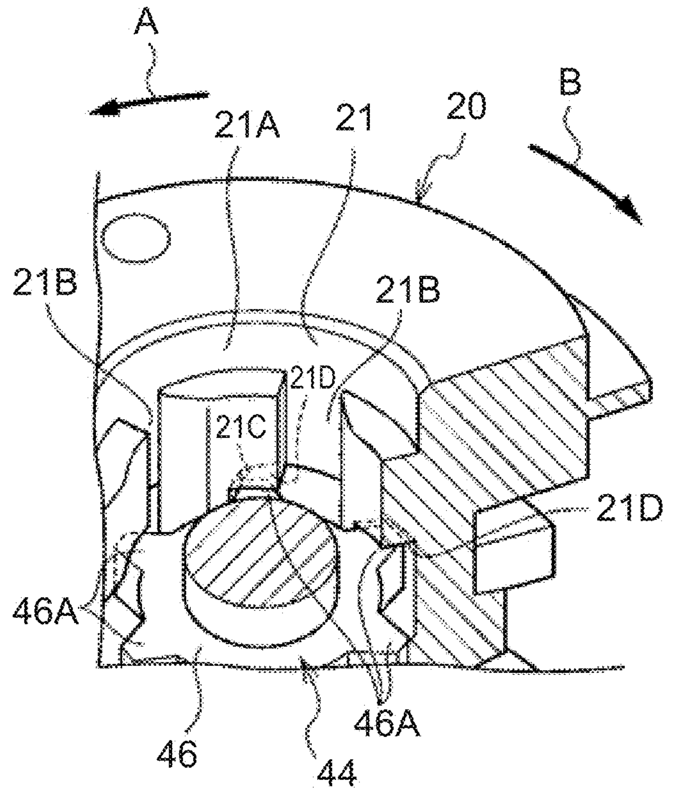
FIG. 6 is a partially broken perspective view illustrating a state at the time of completion of the step of inserting the sub-torsion shaft into the spool.

As illustrated in FIG. 5, the sub-torsion shaft 44 is inserted into the sub-torsion shaft accommodation portion 21A of the spool 20 from the other side in the axial direction of the spool 20. In this event, the first engagement portion 46 of the sub-torsion shaft 44 is inserted into the sub-torsion shaft accommodation portion 21A, and the engaged protrusions 46A of the sub-torsion shaft 44 are inserted into the insertion groove portions 21B of the spool 20. Then, as illustrated in FIG. 6, after the engaged protrusions 46A reach one side portion in the axial direction of the spool 20 of the insertion groove portions 21B, the sub-torsion shaft 44 is rotated in the winding direction. As a result, the engaged protrusions 46A are disposed in the engagement groove portion 21C of the spool 20, and the engaged protrusions 46A are engaged with the axial locking surfaces 21D and the circumferential locking surfaces 21E of the engagement groove portions 21C. Thus, movement of the sub-torsion shaft 44 on the other side in the axial direction and in the winding direction is restricted. Through the above procedure, the sub-torsion shaft 44 is assembled to the spool 20.

Figure 7:
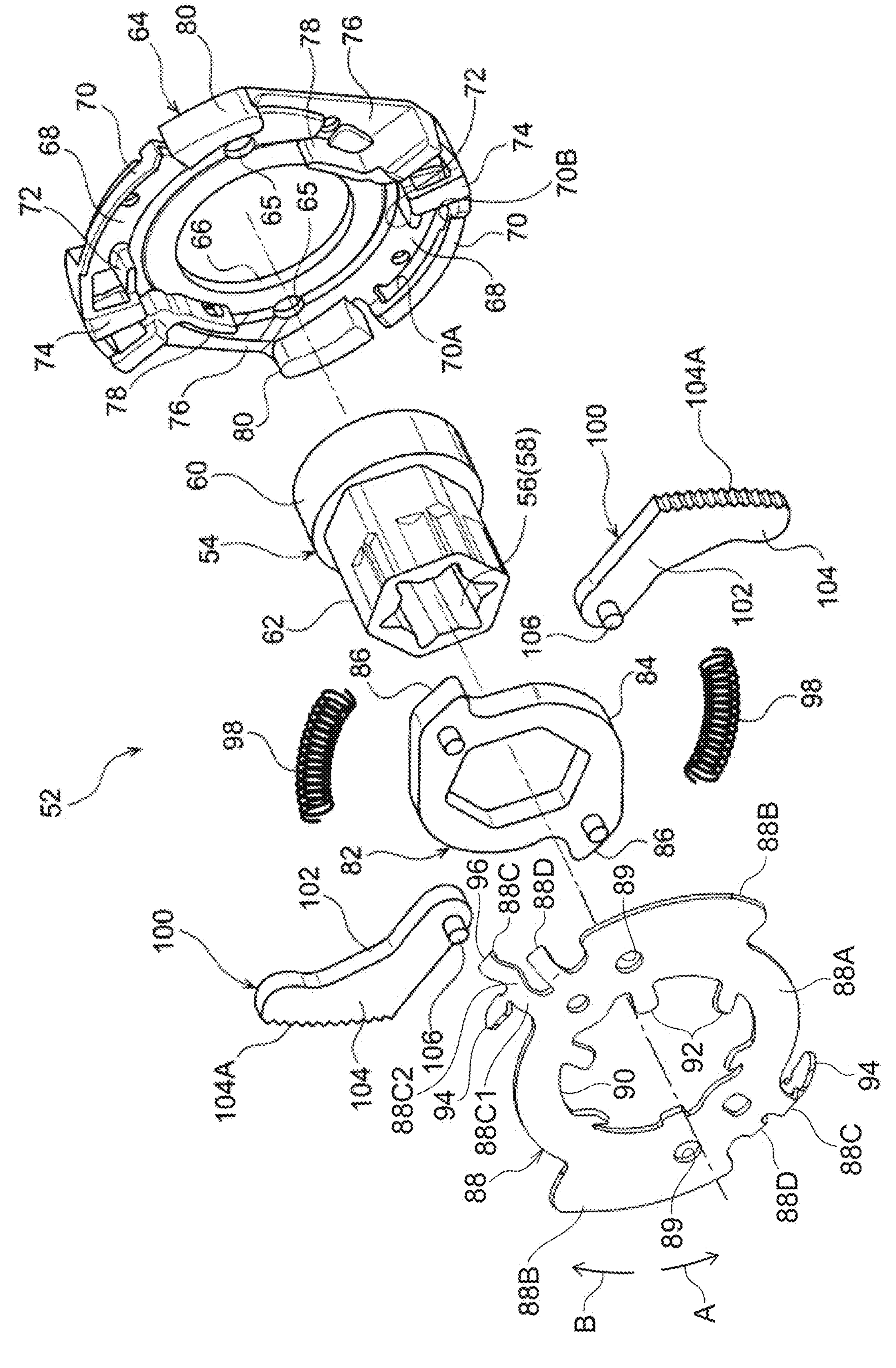
FIG. 7 is an exploded perspective view illustrating a configuration of a clutch of the webbing winding device illustrated in FIG. 1.
Figure 8:
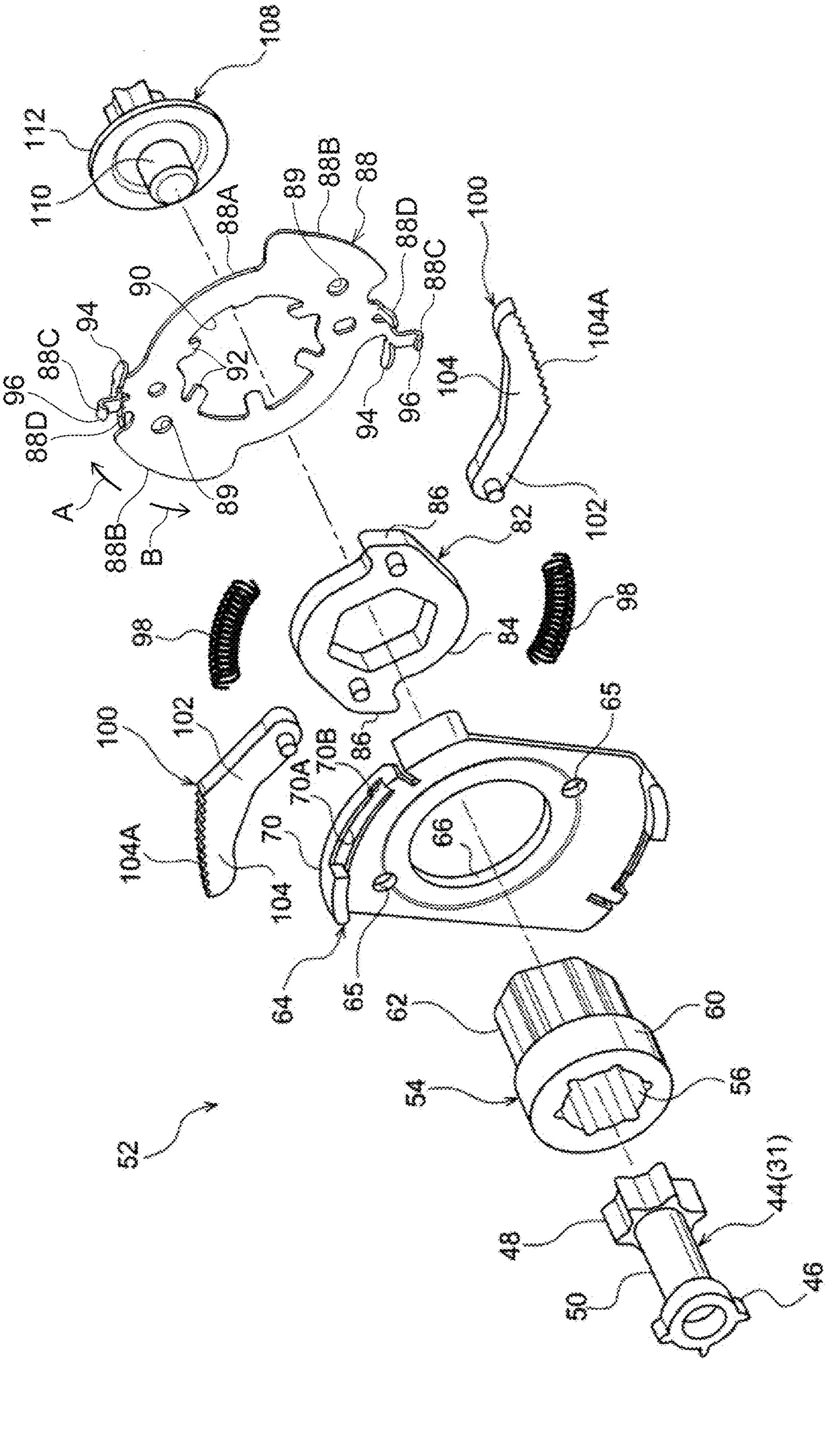
FIG. 8 is an exploded perspective view of the clutch of the webbing winding device illustrated in FIG. 1 as viewed from the spool side.

As illustrated in FIGS. 7 and 8, the clutch 52 includes a sleeve 54, a clutch guide 64, a clutch base 82, a clutch cover 88, a pair of clutch plates 100, a screw 108, and a pair of coil springs 98.

As illustrated in FIG. 8, the sleeve 54 is disposed coaxially with the sub-torsion shaft 44. A through hole 56 penetrating in the axial direction is formed in an axial center portion of the sleeve 54, and the above-described sub-torsion shaft 44 is inserted into the through hole 56. As illustrated in FIG. 7, a spline-shaped engaged portion 58 is formed on a distal end side of an inner peripheral portion of the sleeve 54. As a result of the second engagement portion 48 (see FIG. 1) of the sub-torsion shaft 44 being engaged with the engaged portion 58, the sleeve 54 is integrally rotatably engaged with the sub-torsion shaft 44. A proximal end side of the sleeve 54 is a support portion 60 having a circular outer shape, and a distal end side of the sleeve 54 from the support portion 60 is a fitting portion 62 having a hexagonal outer shape.

The clutch guide 64 is made of resin as an example and is formed in an annular shape having a through hole 66 penetrating in the axial direction. The above-described support portion 60 is inserted into the through hole 66, whereby the clutch guide 64 is supported by the sleeve 54 so as to be relatively rotatable. A pair of coil spring accommodation portions 68 for accommodating the coil springs 98 is formed at two positions in the circumferential direction in the clutch guide 64. These coil spring accommodation portions 68 are arranged in a point symmetrical manner about the center portion of the clutch guide 64 and are each formed in a substantially J shape having an outer wall portion 70 and an inner wall portion 72 extending in the circumferential direction of the clutch guide 64, and a connecting wall portion 74 extending in a radial direction of the clutch guide 64 and connecting end portions of the outer wall portion 70 and the inner wall portion 72. An elongated hole-shaped guide hole 70A whose longitudinal direction is the circumferential direction is formed on the outer wall portion 70.

In the clutch guide 64, a pair of clutch plate accommodation portions 76 for accommodating the clutch plates 100 is formed adjacent to each coil spring accommodation portion 68. In the clutch plate accommodation portions 76, a first support wall portion 78 extending from the connecting wall portion 74 toward a side opposite to the inner wall portion 72 and a second support wall portion 80 spaced apart from the connecting wall portion 74 on a side opposite to the outer wall portion 70 with respect to the connecting wall portion 74 are erected.

The clutch base 82 includes an annular fitted portion 84. The fitting portion 62 of the sleeve 54 is fitted (press-fitted) inside the fitted portion 84, whereby the clutch base 82 is integrally rotatably fixed to the sleeve 54. Further, the clutch base 82 is provided with a pair of locking portions 86 protruding outward from the fitted portion 84. These locking portions 86 are locked to proximal end portions of arm portions 102 formed on the clutch plates 100 described later.

As illustrated in FIGS. 7, 8, 9, and 10, the clutch cover 88 is formed by press processing, or the like, being performed on a metal plate cut into a shape defined as an example. The clutch cover 88 is disposed coaxially with the sleeve 54, is disposed on a side opposite to the spool 20 with respect to the clutch guide 64 and is disposed so as to face the clutch guide 64.

The clutch cover 88 includes a substrate portion 88A formed in an annular shape having a through hole 90 penetrating in the axial direction, and a plurality of fitting claws 92 extending from the substrate portion 88A toward an inner peripheral portion side of the through hole 90. The plurality of fitting claws 92 are arranged at intervals in the circumferential direction and are inclined to the other side in the axial direction with respect to the substrate portion 88A. Then, the fitting portion 62 of the sleeve 54 is inserted into the through hole 90, and the plurality of fitting claws 92 is fitted to the fitting portion 62, so that the clutch cover 88 is integrally rotatably fixed to the sleeve 54 and the sub-torsion shaft 44. In addition, the clutch cover 88 includes a pair of fan-shaped portions 88B extending radially outward from the substrate portion 88A and arranged at intervals in the circumferential direction. The pair of fan-shaped portions 88B cover the pair of clutch plate accommodation portions 76 formed in the clutch guide 64 from the other side in the axial direction.

In addition, the clutch cover 88 includes a pair of locking claw support plate portions 88C extending from the outer peripheral portion of the substrate portion 88A and arranged at intervals in the circumferential direction. Each of the locking claw support plate portions 88C includes a first extending portion 88C1 extending radially outward from the outer peripheral portion of the substrate portion 88A, a second extending portion 88C2 extending axially toward one side from a radially outer end portion of the first extending portion 88C1, and a guide claw portion 96 extending radially outward from the axially one side end of the second extending portion 88C2. Further, the clutch cover 88 includes a pair of spring locking claw portions 94 respectively extending from the second extending portions 88C2 of the pair of locking claw support plate portions 88C in the winding direction. The pair of spring locking claw portions 94 is disposed in a point symmetrical manner about the center of the clutch cover 88. One end portions of the coil springs 98 arranged in the coil spring accommodation portions 68 of the clutch guide 64 are respectively locked to the pair of spring locking claw portions 94. The guide claw portion 96 is disposed in a guide hole 70A provided in the clutch guide 64 and is moved along the guide hole 70A, so that the clutch guide 64 is relatively rotatable within a predetermined range.

Figure 11:
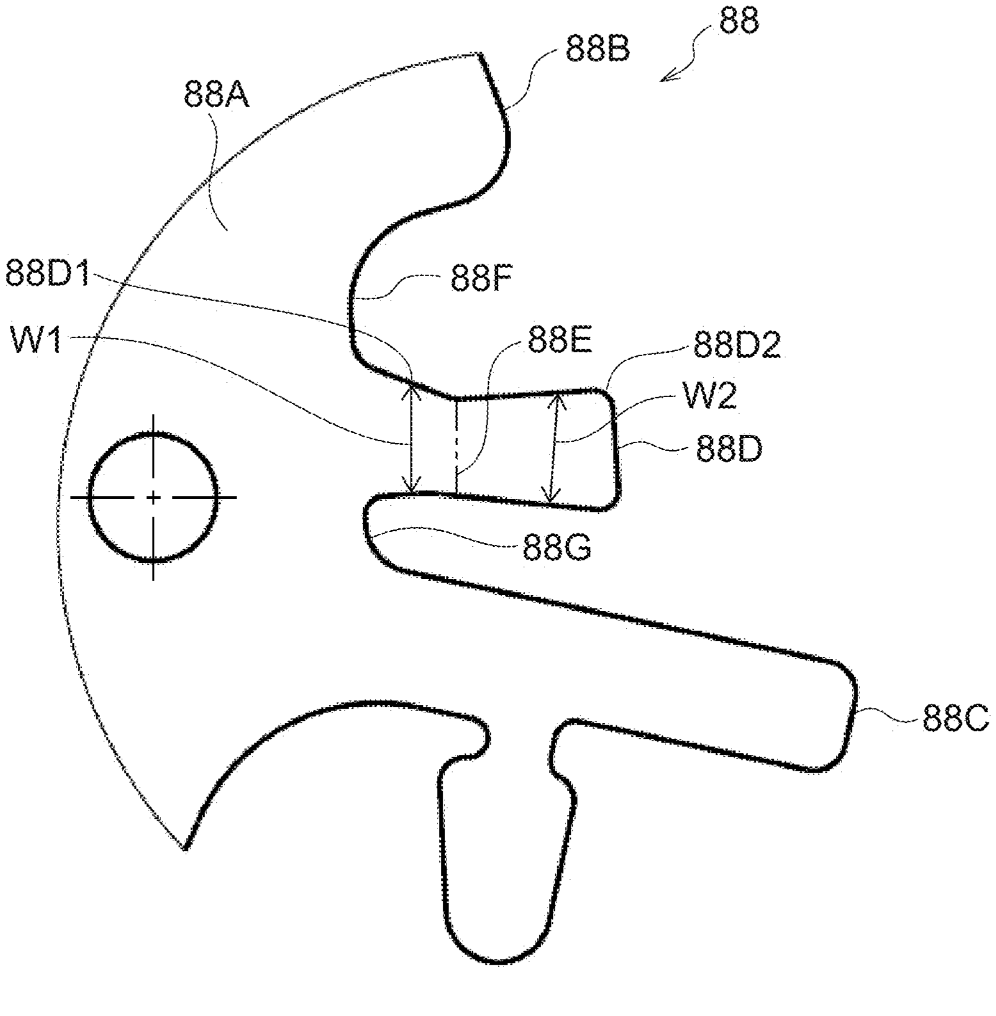
FIG. 11 is a view illustrating a locking piece portion in a state before being bent.

In addition, the clutch cover 88 includes a pair of locking piece portions 88D extending from the outer peripheral portion of the substrate portion 88A and arranged at intervals in the circumferential direction. One locking piece portion 88D is disposed in the pull-out direction side with respect to one locking claw support plate portion 88C in the winding direction side with respect to one fan-shaped portion 88B. The other locking piece portion 88D is disposed in the pull-out direction side with respect to the other locking claw support plate portion 88C and in the winding direction side with respect to the other fan-shaped portion 88B. More specifically, the locking piece portion 88D includes a proximal end portion 88D1 extending radially outward from the outer peripheral portion of the substrate portion 88A, and an inclined portion 88D2 extending obliquely radially outward from a radially outer end portion of the proximal end portion 88D1 toward one side in the axial direction. Here, FIG. 11 illustrates the clutch cover 88 in a state before the inclined portion 88D2 is bent with respect to the proximal end portion 88D1. As illustrated in this drawing, a width dimension W1 of the proximal end portion 88D1 in the circumferential direction gradually increases from a boundary portion 88E between the inclined portion 88D2 and the proximal end portion 88D1 toward a side opposite to the inclined portion 88D2. In addition, a width dimension W2 of the inclined portion 88D2 in the circumferential direction gradually increases from the boundary portion 88E between the inclined portion 88D2 and the proximal end portion 88D1 toward a side opposite to the proximal end portion 88D1.

Figure 9:
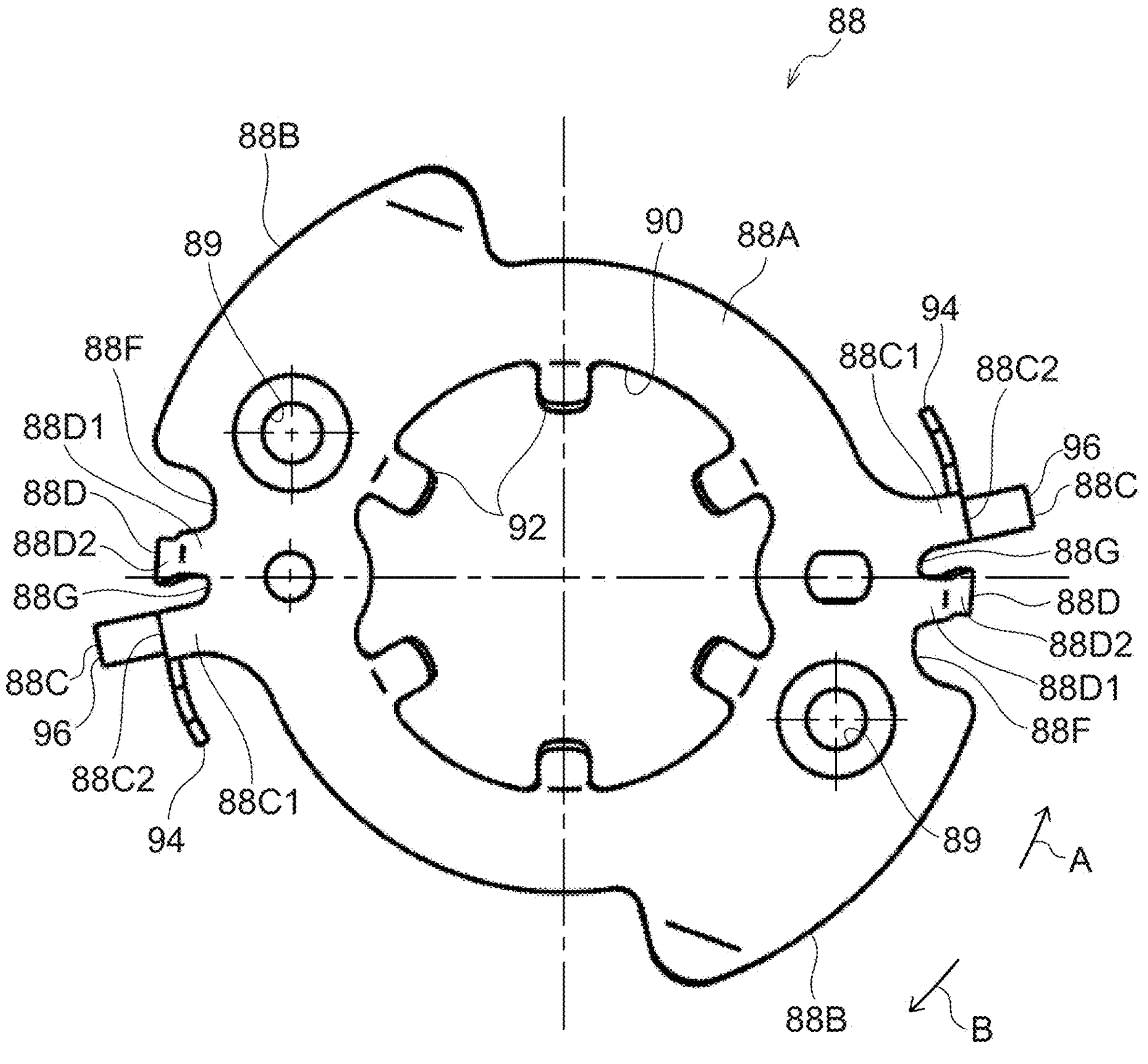
FIG. 9 is a view of a clutch cover as viewed from the other side in the axial direction.
Figure 10:
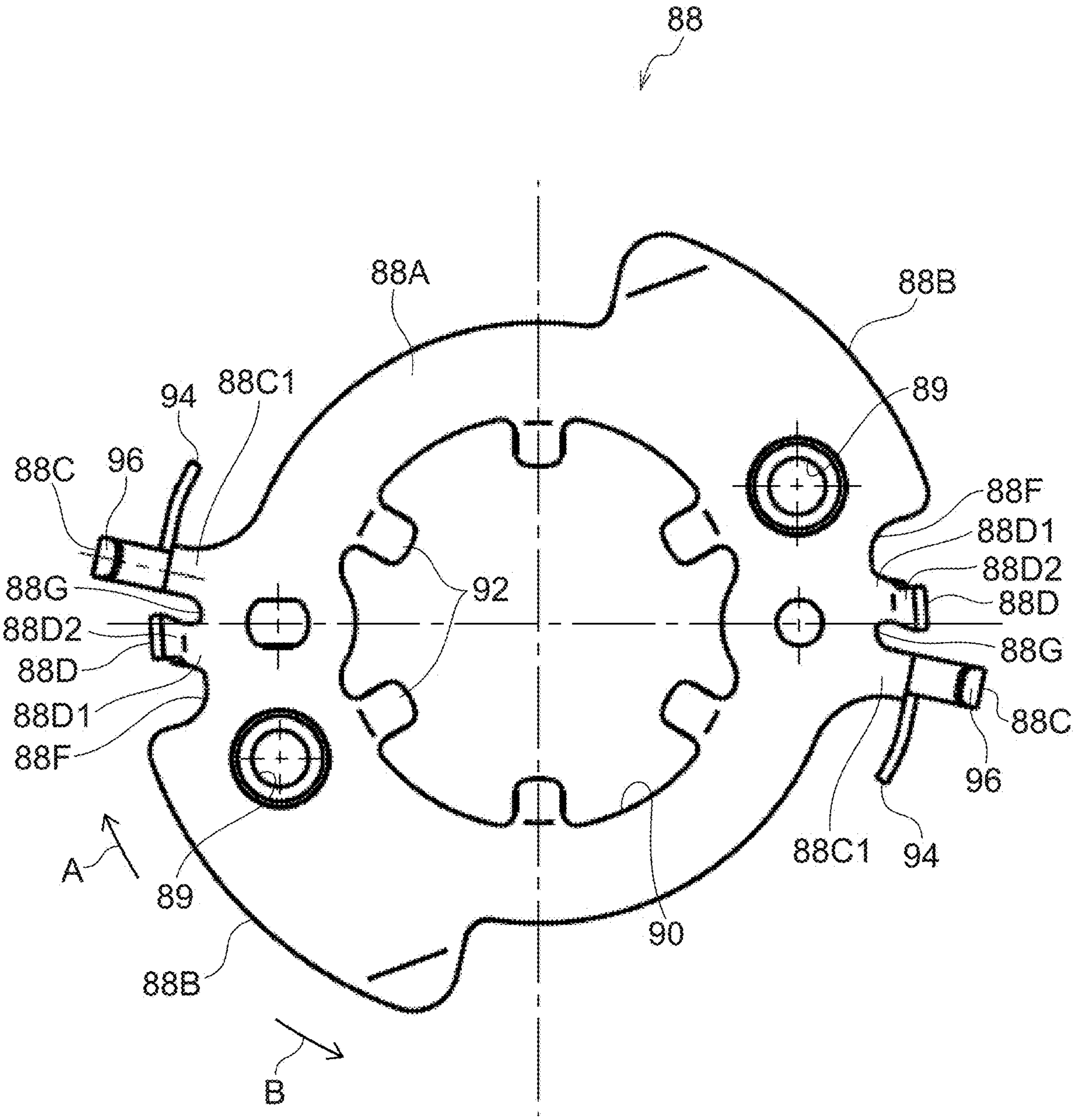
FIG. 10 is a view of the clutch cover as viewed from one side in the axial direction.

As illustrated in FIGS. 9 and 10, a recess 88F opened radially outward is formed between the locking piece portion 88D and the fan-shaped portion 88B when viewed from the axial direction. An interval in the circumferential direction between the locking piece portion 88D and the fan-shaped portion 88B constituting both edges in the circumferential direction in the recess 88F is set to be larger than an outer diameter of the distal end portion of the trigger wire 40 (see FIG. 1). In addition, a recess 88G opened radially outward is formed between the locking piece portion 88D and the locking claw support plate portion 88C in a state viewed from the axial direction. An interval in the circumferential direction between the locking piece portion 88D and the locking claw support plate portion 88C constituting both edges in the circumferential direction in the recess 88G is set to be smaller than the outer diameter of the distal end portion of the trigger wire 40 (see FIG. 1).

Figure 12:
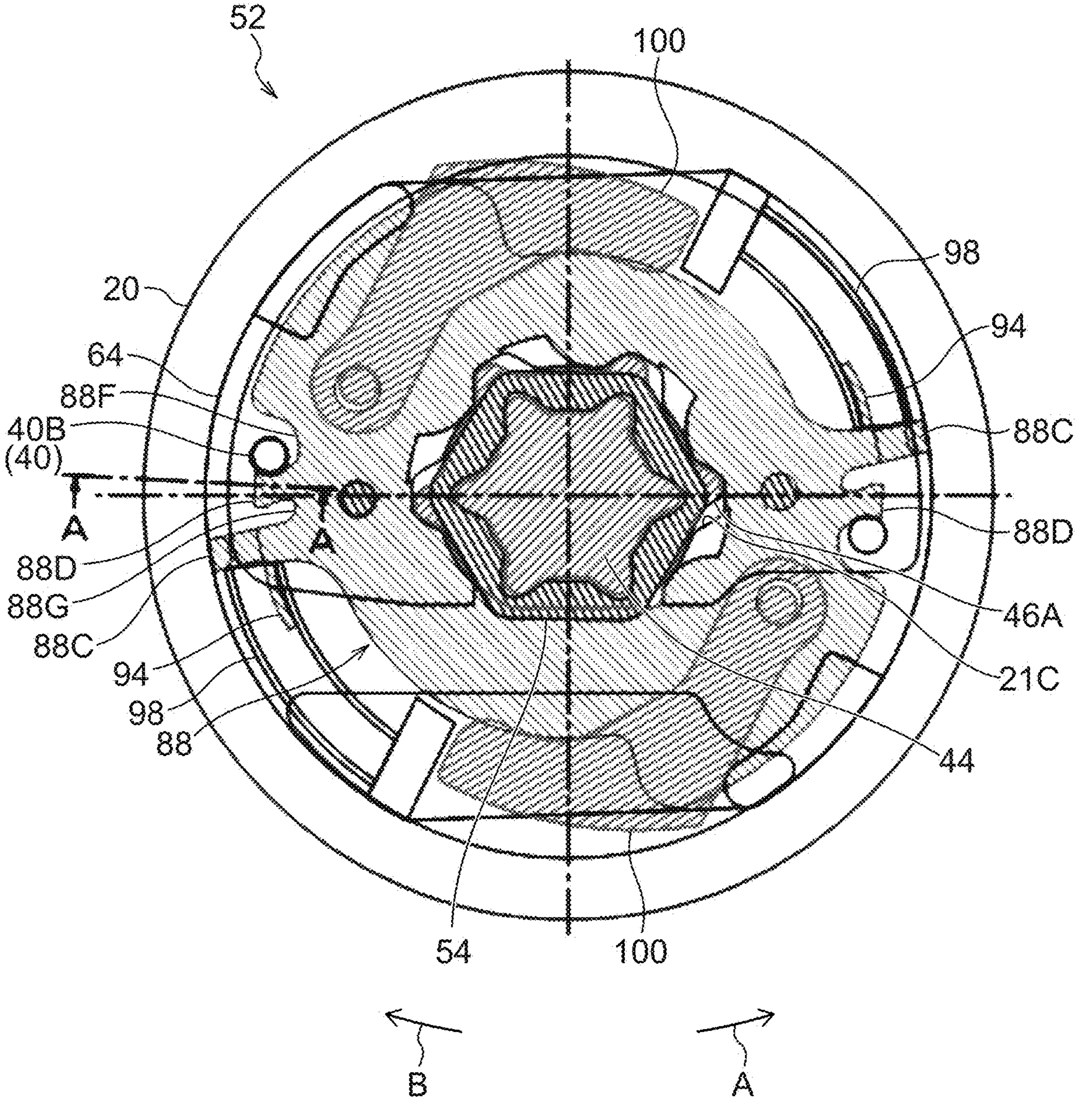
FIG. 12 is a cross-sectional view illustrating a clutch, and the like, cut at a portion corresponding to the clutch cover.
Figure 13:
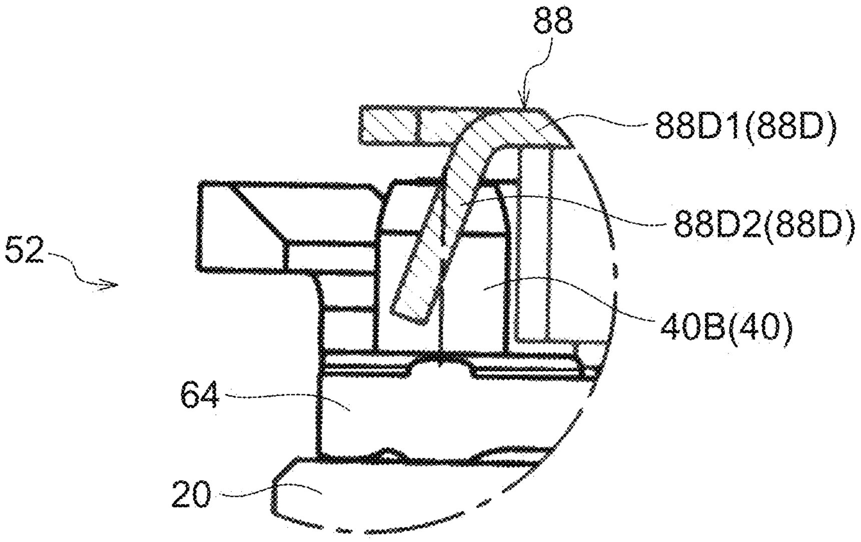
FIG. 13 is a cross-sectional view illustrating the clutch, and the like, cut along a line A-A illustrated in FIG. 12.

Then, as illustrated in FIGS. 12 and 13, when the sub-torsion shaft 44 to which the clutch 52 is attached is assembled to the spool 20, an end surface on the pull-out direction side of one locking piece portion 88D of the clutch cover 88 is locked to the distal end portion 40B of the trigger wire 40. As a result, rotation of the sub-torsion shaft 44 integrally rotatable with the sub-torsion shaft 44 in the pull-out direction is restricted. As a result, as illustrated in FIG. 6, a state in which the sub-torsion shaft 44 is assembled to the spool 20 is maintained.

As illustrated in FIG. 7, the clutch plates 100 are disposed between the clutch cover 88 and the clutch guide 64. Each of the clutch plates 100 includes an arm portion 102 and an arcuate portion 104 formed at a distal end portion of the arm portion 102. Rotating shaft 106 protruding toward the clutch cover 88 and extending along the axial direction of the sub-torsion shaft 44 are formed at proximal end portions of the arm portions 102. By the rotating shafts 106 being inserted into holes 89 formed in the clutch cover 88, the clutch plates 100 are rotatably supported by the clutch cover 88. Flat knurled teeth 104A are formed on outer peripheral portions of the arcuate portions 104 (distal end portions of the clutch plates 100).

As illustrated in FIG. 8, the screw 108 includes a screw portion 110 and a pressing portion 112 having a larger diameter than the screw portion 110. The screw portion 110 is screwed into a screw hole 45 (see FIG. 1) formed at the distal end portion of the sub-torsion shaft 44, whereby the screw 108 is fixed to the distal end portion of the sub-torsion shaft 44. In addition, in a state where the screw 108 is fixed to the distal end portion of the sub-torsion shaft 44 in this manner, the pressing portion 112 abuts on the distal end portion of the sleeve 54. Thus, movement of the sleeve 54 in the pull-out direction with respect to the sub-torsion shaft 44 is restricted. In this state, movement of the clutch guide 64 in the axial direction is restricted by the clutch cover 88 and the spool 20.

As illustrated in FIGS. 7 and 8, a hole portion 65 is formed in the clutch guide 64. The distal end portion 40B (see FIG. 1) of the trigger wire 40 is inserted into the hole portion 65. Accordingly, relative rotation of the clutch guide 64 with respect to the spool 20 and the clutch cover 88 is restricted in a state where the clutch guide 64 is disposed at the non-operating position (the clutch guide 64 is restrained at the non-operating position).

Furthermore, as described above, in a state where the clutch guide 64 is restrained at the non-operating position, the coil springs 98 are compressed between the coil spring accommodation portions 68 (connecting wall portions 74) of the clutch guide 64 and the spring locking claw portions 94 of the clutch cover 88.

On the other hand, in this state, a gap between the hole portions 89 of the clutch cover 88 (the rotating shafts 106 of the clutch plates 100) and the connecting wall portions 74 is sufficiently secured, and the clutch plates 100 are accommodated in the clutch plate accommodation portions 76 such that the knurled teeth 104A are accommodated inside the outer peripheral portion of the clutch guide 64. Further, in this state, the connecting wall portions 74 abut on distal ends of the arcuate portions 104.

Functions and Effects of Present Embodiment

Next, functions and effects of the present embodiment will be described.

As illustrated in FIGS. 1, 7, and 8, in the webbing winding device 10 according to the present embodiment, the spool 20, the lock gear 24, the main torsion shaft 32, the sub-torsion shaft 44, and the clutch 52 (including the sleeve 54, the clutch base 82, the clutch plates 100, and the screw 108) are integrally rotatable in the winding direction and in the pull-out direction. Thus, as a result of the webbing 22 being pulled out from the spool 20, the webbing 22 is worn on the body of the occupant of the vehicle. In addition, in a state where the webbing 22 is worn on the body of the occupant of the vehicle, for example, if the vehicle suddenly decelerates and the lock mechanism is activated, rotation of the lock gear 24 in the pull-out direction is restricted. As a result, the spool 20 connected to the lock gear 24 via the main torsion shaft 32 is restricted from rotating in the pull-out direction, and the webbing 22 is restricted from being pulled out from the spool 20. Thus, the body of the occupant who tries to move forward in the vehicle is restrained by the webbing 22.

In addition, in a state where rotation of the lock gear 24 in the pull-out direction is restricted, if the body of the occupant pulls the webbing 22 with larger force and rotational force of the spool 20 in the pull-out direction based on tensile force exceeds a twist resistance load (deformation resistance load) of the first energy absorption portion 38 of the main torsion shaft 32, the force limiter mechanism 31 is activated, and the spool 20 is allowed to rotate in the pull-out direction at a force limiter load (twist resistance load of the first energy absorption portion 38) or more by the twist (deformation) of the first energy absorption portion 38.

Thus, the spool 20 is rotated in the pull-out direction by the twist of the first energy absorption portion 38, and the webbing 22 is pulled out from the spool 20, whereby the load (load) on the chest of the occupant by the webbing 22 is reduced. In addition, kinetic energy of the occupant to be used for pulling the webbing 22 is absorbed by an amount of twist of the first energy absorption portion 38.

On the other hand, as described above, the spool 20 being rotated in the pull-out direction with respect to the lock gear 24 means that the lock gear 24 is relatively rotated in the winding direction with respect to the spool 20. Thus, if the lock gear 24 is relatively rotated in the winding direction with respect to the spool 20, the proximal end portion 40A of the trigger wire 40 is moved in the circumferential direction of the main torsion shaft 32 while the distal end side of the trigger wire 40 with respect to the proximal end portion 40A is inserted into the hole portion 42 of the spool 20, so that the distal end side of the trigger wire 40 with respect to the proximal end portion 40A is pulled toward the lock gear 24 with respect to the hole portion 42.

As a result, the distal end portion 40B of the trigger wire 40 is released by being pulled out from the hole portion 65 of the clutch guide 64, and a state where relative rotation of the clutch guide 64 with respect to the spool 20 and the clutch cover 88 is restricted is released.

If the clutch guide 64 is rotated from the non-operating position to an operating position by biasing force of the coil springs 98, an interval between the hole portions 89 of the clutch cover 88 (the rotating shafts 106 of the clutch plates 100) and the connecting wall portions 74 of the clutch guide 64 is shortened, and distal ends of the arcuate portions 104 of the clutch plates 100 are pressed (guided) in a tangential direction of the clutch guide 64 by the connecting wall portions 74. As a result, the clutch plates 100 are rotated toward the lock member (not illustrated), and the knurled teeth 104A of the clutch plates 100 mesh with the lock member. As a result, the clutch plates 100 and the lock ring 190 are coupled. In addition, in this event, the locking portion 86 formed on the clutch base 82 pushes the proximal end portions of the arm portions 102 of the clutch plates 100 in the pull-out direction, so that the clutch plates 100 are pressed against the lock ring 190, and the coupled state of both is maintained.

Here, in a state where rotation of the lock member is stopped, the body of the occupant pulls the webbing 22 with larger force, and if rotational force of the spool 20 in the pull-out direction based on tensile force exceeds a sum of the twist resistance load (deformation resistance load) of the first energy absorption portion 38 of the main torsion shaft 32 and the twist resistance load (deformation resistance load) of the second energy absorption portion 50 of the sub-torsion shaft 44, the twist (deformation) of the first energy absorption portion 38 and the second energy absorption portion 50 allows the spool 20 to rotate in the pull-out direction at a force limiter load (the sum of the twist resistance load of the first energy absorption portion 38 and the twist resistance load of the second energy absorption portion 50) or more.

Thus, as a result of the spool 20 being rotated in the pull-out direction by the twist of the first energy absorption portion 38 and the second energy absorption portion 50 and the webbing 22 being pulled out from the spool 20, the load (load) on the chest of the occupant by the webbing 22 is reduced, and the kinetic energy of the occupant to be used for pulling the webbing 22 is absorbed by the twist of the first energy absorption portion 38 and the second energy absorption portion 50.

On the other hand, in a state where rotation of the lock member is allowed, the lock member is rotatable in the pull-out direction together with the clutch 52 (the sleeve 54, the clutch base 82, and the clutch plates 100) and the spool 20. Thus, the second energy absorption portion 50 is not twisted, and thus, rotation of the spool 20 in the pull-out direction at a force limiter load (a twist resistance load of the first energy absorption portion 38) or more is allowed by the twist (deformation) of the first energy absorption portion 38.

In other words, in a state where rotation of the lock member is stopped, the force limiter load is made a sum of the twist resistance load of the first energy absorption portion 38 and the twist resistance load of the second energy absorption portion 50, and a load value of the force limiter load is made high. On the other hand, in a state where rotation of the lock member is allowed, the force limiter load is made the twist resistance load of the first energy absorption portion 38, and the load value of the force limiter load is made low.

Here, as illustrated in FIGS. 6, 12, and 13, in the present embodiment, when the sub-torsion shaft 44 to which the clutch 52 is attached is assembled to the spool 20, the end surface on the pull-out direction side of one locking piece portion 88D of the clutch cover 88 is locked to the distal end portion 40B of the trigger wire 40. As a result, rotation of the sub-torsion shaft 44 integrally rotatable with the sub-torsion shaft 44 in the pull-out direction is restricted. As a result, a state in which the sub-torsion shaft 44 is assembled to the spool 20 is maintained. As described above, in the present embodiment, the stopper member for restricting rotation of the sub-torsion shaft 44 assembled to the spool 20 in the pull-out direction with respect to the spool 20 can be eliminated.

Further, in the present embodiment, the clutch cover 88 having the locking piece portion 88D can be easily formed by press processing, or the like, being performed on a metal plate.

Further, in the present embodiment, as illustrated in FIGS. 9, 10, 12, and 13, recesses 88F, 88G opened outward in a rotational radial direction are formed on both sides in the rotational circumferential direction of the locking piece portion 88D in the clutch cover 88. Here, an interval in the circumferential direction between the locking piece portion 88D and the fan-shaped portion 88B constituting both edges in the circumferential direction in one recess 88F (first recess) is set to be larger than the outer diameter of the distal end portion of the trigger wire 40 (see FIG. 1). Further, an interval in the circumferential direction between the locking piece portion 88D and the locking claw support plate portion 88C constituting both edges in the circumferential direction in the other recess 88G (second recess) is set to be smaller than the outer diameter of the distal end portion of the trigger wire 40 (see FIG. 1). Thus, the locking piece portion 88D is locked to the distal end portion of the trigger wire 40 in a state where the trigger wire 40 can be disposed in the one recess 88F. In addition, the distal end portion 40B of the trigger wire 40 cannot be disposed in the other recess 88G. As a result, it is possible to prevent the locking piece portion 88D from being locked to the distal end portion 40B of the trigger wire 40 in a state where the distal end portion 40B of the trigger wire 40 is disposed in the other recess 88G. In other words, it is possible to prevent erroneous assembly at the time of manufacturing the webbing winding device 10.

In the present embodiment, as illustrated in FIGS. 9, 10, and 11, the width dimension W1 of the proximal end portion 88D1 in the circumferential direction gradually increases from the boundary portion 88E between the inclined portion 88D2 and the proximal end portion 88D1 toward the side opposite to the inclined portion 88D2. In addition, the width dimension W2 of the inclined portion 88D2 in the circumferential direction gradually increases from the boundary portion 88E between the inclined portion 88D2 and the proximal end portion 88D1 toward a side opposite to the proximal end portion 88D1. In this configuration, durability against a load in the circumferential direction of the proximal end portion 88D1 can be secured, and excellent press workability at the time of punching the outer shape of the clutch cover 88 can be achieved.

In the present embodiment described above, an example in which the distal end portion 40B of the trigger wire 40 cannot be disposed in the other recess 88G to prevent erroneous assembly at the time of manufacturing the webbing winding device 10 has been described, but the disclosure is not limited thereto. For example, erroneous assembly at the time of manufacturing the webbing winding device 10 may be prevented by adopting the clutch cover 88 having a configuration in which the other recess 88G is not formed.

Further, in the present embodiment, an example in which the clutch cover 88 is formed by press processing, or the like, being performed on a metal plate has been described, but the disclosure is not limited thereto. A material for forming the clutch cover 88 may be appropriately set in consideration of strength required for the clutch cover 88, and the like.

Furthermore, in the present embodiment, an example has been described in which the stopper member for restricting rotation of the sub-torsion shaft 44 in the pull-out direction with respect to the spool 20 is eliminated by part (locking piece portion 88D) of the clutch cover 88 being locked to the distal end portion 40B of the trigger wire 40, but the disclosure is not limited thereto. For example, a stopper member for restricting rotation of the sub-torsion shaft 44 in the pull-out direction with respect to the spool 20 may be eliminated by part of another member (for example, the sleeve 54 or the clutch base 82) relatively non-rotatably engaged with the sub-torsion shaft 44 being locked to the distal end portion 40B of the trigger wire 40.

Configuration for Easily Screwing Screw Into Sub-Torsion Shaft

Next, a configuration for easily screwing the screw 108 into the sub-torsion shaft 44 will be described with reference to FIG. 14. In the members and portions illustrated in FIG. 14, the members and portions corresponding to the webbing winding device 10 are denoted by the same reference numerals as the members and portions corresponding to the webbing winding device 10, and the description thereof may be omitted.

Figure 14:
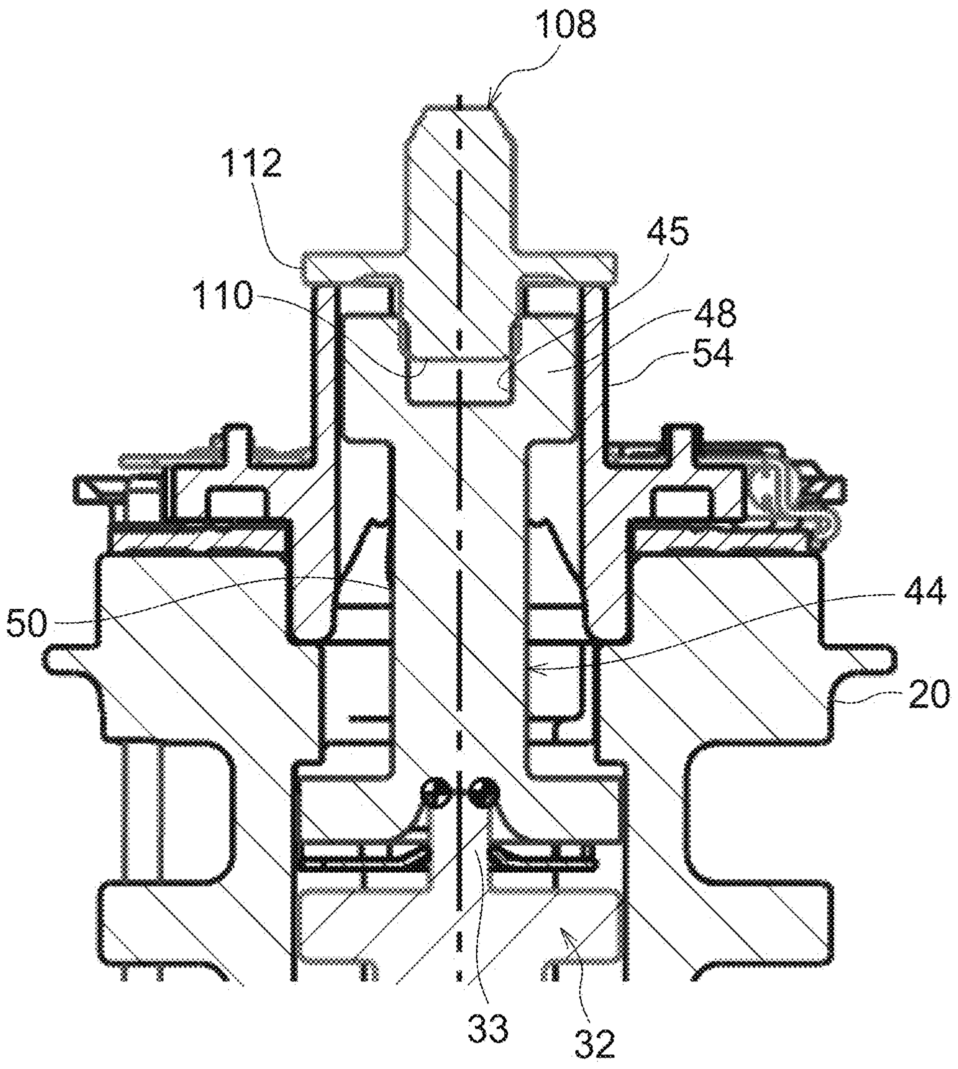
FIG. 14 is a cross-sectional view illustrating a main torsion shaft, the sub-torsion shaft, and the like, to which a configuration for easily screwing a screw into the sub-torsion shaft is applied.

As illustrated in FIG. 14, the main torsion shaft 32 is provided with a columnar shaft portion 33 protruding from a shaft core portion of the second engagement portion 36 toward the sub-torsion shaft 44. When the main torsion shaft 32 side is directed downward, the first engagement portion 46 side of the sub-torsion shaft 44 abuts on the shaft portion 33. As a result, downward displacement of the sub-torsion shaft 44 with respect to the sleeve 54 is restricted, which can secure a hooking margin between the screw portion 110 of the screw 108 and the screw hole 45 of the sub-torsion shaft 44. As a result, the screw 108 can be easily screwed into the sub-torsion shaft 44.

Although one embodiment of the disclosure has been described above, the disclosure is not limited to the above, and it is a matter of course that various modifications other than the above can be made without departing from the gist of the disclosure.

What is claimed is:

1. A webbing winding device, comprising:

a spool around which webbing to be worn by an occupant is wound, and which is rotated in a pull-out direction by the webbing being pulled out;

a trigger member provided at the spool;

a torsion shaft engaged with the spool by being inserted into the spool along an axial direction of the spool and being rotated, assembled to the spool with movement thereof in the axial direction relative to the spool being restricted, and twisted to allow rotation of the spool in the pull-out direction; and a clutch with which the torsion shaft is engaged and the trigger member is engaged, and in which part of a member engaged with the torsion shaft so as to be relatively non-rotatable is locked to the trigger member to restrict rotation of the torsion shaft with respect to the spool in an opposite direction from a direction in which the torsion shaft is rotated for assembly to the spool, the clutch being operated by being released by actuation of the trigger member and engaged with a lock member to restrict rotation with respect to the lock member.

2. The webbing winding device according to claim 1, wherein the clutch includes:

a clutch guide which is supported in a state of being relatively rotatable with respect to the torsion shaft and with which the trigger member is engaged to restrict rotation, a sleeve that is integrally rotatably engaged with the torsion shaft and that supports the clutch guide in a relatively rotatable manner, a clutch cover fixed to the torsion shaft in a state of being relatively non-rotatable with respect to the torsion shaft, and a clutch plate that is provided between the clutch guide and the clutch cover and that is displaced by relative rotation of the clutch guide with respect to the sleeve, thereby being engaged with the lock member; and part of the clutch cover is engaged with the trigger member to restrict rotation of the torsion shaft with respect to the spool.

3. A webbing winding device, comprising:

a spool around which webbing to be worn by an occupant is wound, and which is rotated in a pull-out direction by the webbing being pulled out;

a trigger member provided at the spool;

a torsion shaft engaged with the spool and twisted to allow rotation of the spool in the pull-out direction; and a clutch with which the torsion shaft is engaged and the trigger member is engaged, and in which part of a member engaged with the torsion shaft so as to be relatively non-rotatable is locked to the trigger member to restrict rotation of the torsion shaft with respect to the spool, the clutch being operated by being released by actuation of the trigger member and engaged with a lock member to restrict rotation with respect to the lock member, wherein the clutch includes:

a clutch guide which is supported in a state of being relatively rotatable with respect to the torsion shaft and with which the trigger member is engaged to restrict rotation, a sleeve that is integrally rotatably engaged with the torsion shaft and that supports the clutch guide in a relatively rotatable manner, a clutch cover fixed to the torsion shaft in a state of being relatively non-rotatable with respect to the torsion shaft, and a clutch plate that is provided between the clutch guide and the clutch cover and that is displaced by relative rotation of the clutch guide with respect to the sleeve, thereby being engaged with the lock member, wherein part of the clutch cover is engaged with the trigger member to restrict rotation of the torsion shaft with respect to the spool, and wherein part of the clutch cover is a locking piece portion that extends toward the trigger member and is locked to the trigger member.

4. The webbing winding device according to claim 3, wherein:

a first recess and a second recess which open outward in a rotational radial direction are formed on both sides in a rotational circumferential direction of the locking piece portion in the clutch cover, the locking piece portion is locked to the trigger member in a state in which the trigger member can be disposed in the first recess, and the trigger member cannot be disposed in the second recess.

5. The webbing winding device according to claim 4, wherein:

an interval in the rotational circumferential direction between both edges in the rotational circumferential direction of the first recess is larger than an outer diameter of a distal end portion of the trigger member, and an interval in the rotational circumferential direction between both edges in the rotational circumferential direction of the second recess is smaller than the outer diameter of the distal end portion of the trigger member.

6. The webbing winding device according to claim 3, wherein:

the clutch cover includes a substrate portion formed in an annular shape having a through hole penetrating in an axial direction, and the locking piece portion includes a proximal end portion extending radially outward from an outer peripheral portion of the substrate portion, and an inclined portion extending obliquely radially outward from a radially outer end portion of the proximal end portion toward one side in the axial direction.

7. The webbing winding device according to claim 6, wherein:

a width dimension of the proximal end portion in a rotational circumferential direction gradually increases from a boundary portion between the inclined portion and the proximal end portion toward a side opposite to the inclined portion, and a width dimension of the inclined portion in the rotational circumferential direction gradually increases from the boundary portion toward a side opposite to the proximal end portion.

* * * * *